(12) United States Patent
Tin

(10) Patent No.: US 7,423,791 B2
(45) Date of Patent: Sep. 9, 2008

(54) COLOR CONVERSION USING BARYCENTRIC PROJECTIONS

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 755 days.

(21) Appl. No.: 11/042,140

(22) Filed: Jan. 26, 2005

(65) Prior Publication Data

US 2006/0164662 A1 Jul. 27, 2006

(51) Int. Cl.
*H04N 1/46* (2006.01)
*H04N 1/54* (2006.01)
*H04N 1/56* (2006.01)

(52) U.S. Cl. .......... 358/525; 358/1.9; 358/500; 358/523; 382/300; 345/600; 345/601; 345/602; 345/603; 345/604; 345/606; 345/609; 345/610

(58) Field of Classification Search ........ 358/1.9, 358/500, 525, 523; 382/300; 345/600, 601, 345/602, 603, 604, 606, 609, 610
See application file for complete search history.

(56) References Cited

U.S. PATENT DOCUMENTS

| | | | |
|---|---|---|---|
| 4,275,413 A | 6/1981 | Sakamoto et al. | 358/525 |
| 4,511,989 A | 4/1985 | Sakamoto | 708/290 |
| 6,185,325 B1 | 2/2001 | Sakaida et al. | 382/162 |
| 6,323,969 B1 * | 11/2001 | Shimizu et al. | 358/523 |
| 6,335,800 B1 | 1/2002 | Balasubramanian | 358/1.9 |
| 6,373,580 B1 | 4/2002 | Walker | 358/1.1 |
| 6,411,305 B1 | 6/2002 | Chui | 345/660 |
| 6,940,503 B2 * | 9/2005 | Vlachos et al. | 345/419 |
| 6,956,202 B2 * | 10/2005 | Sabczynski et al. | 250/252.1 |
| 6,982,710 B2 | 1/2006 | Salomie | 345/420 |
| 7,019,868 B2 | 3/2006 | Chang et al. | 358/2.1 |
| 7,023,585 B1 | 4/2006 | Borg | 358/1.9 |
| 7,098,924 B2 * | 8/2006 | Prokopenko et al. | 345/581 |
| 2005/0254073 A1 | 11/2005 | Braun et al. | 358/1.9 |
| 2006/0055946 A1 | 3/2006 | Agar et al. | 358/1.9 |

OTHER PUBLICATIONS

U.S. Appl. No. 10/740,395 (Cameron, A.-L. et al.), filed Dec. 22, 2003.

(Continued)

*Primary Examiner*—Mark Zimmerman
*Assistant Examiner*—Beniyam Menberu
(74) *Attorney, Agent, or Firm*—Fitzpatrick, Cella, Harper & Scinto.

(57) ABSTRACT

A method and apparatus for interpolating values for a color space from an input color value. A unit hypercube enclosing the input value is generated based on values from a look up table. A set of boundary conditions are then imposed on the unit hypercube. To perform the actual interpolation, an initial barycentric projection is performed from a selected vertex of the unit hypercube through the input value onto a boundary of the unit hypercube. If the projection satisfies one of the boundary conditions, an interpolated value is calculated using the projection by back substitution. If the initial projection does not satisfy a boundary condition, an intermediate value is generated from the previous projection and successive barycentric projections are performed using respectively different vertices of the unit hypercube through intermediate values onto a boundary of the unit hypercube until a projection satisfies one of the boundary conditions.

10 Claims, 9 Drawing Sheets

OTHER PUBLICATIONS

Amidror, I., "Scattered data interpolation methods for electronic imaging systems: a survey," *Journal of Electronic Imaging*, 11(2), 157-176 (Apr. 2002).

Allebach, J.P. et al., "Efficient Implementation of Nonlinear Color Transformations," *1st Color Imaging Conference Proceedings*, 143-148 (1993).

Kang, H.R., "Color Technology for Electronic Imaging Devices," SPIE Optical Engineering Press (1997).

Gennetten, Douglas K., "RGB to CMYK conversion using 3-D barycentric interpolation," *SPIE*, vol. 1909, 116-126 (Feb. 1993).

* cited by examiner

COLOR CONVERSION USING BARYCENTRIC PROJECTIONS

BACKGROUND

1. Field of the Invention

The present invention relates generally to color conversion and more particularly to color conversion using interpolation of values using look up tables.

2. Description of the Related Art

Electronic imaging systems necessarily involve color space conversions. A system that captures images in Red Green Blue (RGB) space and reproduces them on a Cyan Magenta Yellow blacK (CMYK) printer needs to convert each pixel of the image from RGB space to CMYK space. Also inherent in all but the simplest color space conversion is nonlinearity of the transformation. For example, the RGB to CMYK conversion is usually not a linear transformation. One common technique to handle general nonlinear transformation is through the use of a Look-Up Table (LUT). To generate a LUT, a rectangular grid of nodes is imposed on the source color space and a value in the destination color space is evaluated at each of the nodes. In use, for any color in the source color space that is not one of the nodes, an interpolation algorithm is used.

FIG. 1 is a block diagram illustrating use of a LUT by a color device to map from one color space to another. In this example, a data processing system, such as computer 100, maps color values of a first color device, such as color scanner 99, to color values for a second color device, such as color printer 101. For example, the data processing system may map RGB color value 102 generated by the color scanner to CMYK color value 104 used by the color printer. The data processing system does so using one of several LUTs, 106, 108, 110 and 112. The choice of the interpolation algorithm depends on the geometrical arrangement of the sampling points. If the points are totally unstructured, or what is known as a "point cloud" 106, then interpolation methods suitable for scattered data are used. Such methods are generally slow, and are employed only in situations where the sampling locations cannot be arranged.

On the other extreme of point clouds is the case where the sampling points fall on a rectangular grid 108. The simplest situation of a rectangular grid is one with uniform sampling in each channel. Given an input point, its enclosing cell can be efficiently located, then an interpolation algorithm, such as tetrahedral interpolation, can be used to perform the interpolation within this enclosing cell.

A slightly more complicated situation is a rectangular grid 110 with non-uniform sampling in each channel. In the case of non-uniformly sampled rectangular grid, the enclosing cell can still be determined quite easily, though not as efficiently as the uniform case. Once the enclosing cell is determined, interpolation within the cell is done the same way as the uniform case.

In between the totally unstructured configuration of point cloud, and the totally structured configuration of a rectangular grid lies an "adaptive rectangular grid" 112. An adaptive rectangular grid still employs rectangular grids (possibly non-uniformly sampled) on subspaces, but these grids are not compatible as a whole. Adaptive sampling is useful to reduce the sampling rate, that is, increase the storage efficiency, in a region of the color space that is less important. For example, in the standard IT8.7/3 target for CMYK printers, sampling on each CMY "plane" for a fixed K is uniform rectangular, but the sampling rate is successively reduced as K increases, because the colors get darker and variations become smaller to make high sampling rate wasteful.

A traditional approach to performing interpolation on an adaptive rectangular grid is called Sequential Linear Interpolation (SLI). The key step reduces an n-dimensional interpolation to two (n−1)-dimensional interpolations and a 1-dimensional interpolation, and the same procedure can be applied to each of the (n−1)-dimensional interpolation problems, hence the name "sequential".

Several things are not desirable about SLI:

1. SLI does not preserve all the symmetries. In fact, suppose the grid is uniformly rectangular, and SLI is applied all the way to dimension 1. This results in the same result as multilinear interpolation (usually called cubic interpolation in the case of 3 dimensions). Points on the principal diagonal are interpolated using all the corner points of the cube. This is not desirable if the principal diagonal is the gray axis (as in RGB space) because one prefers grays to be interpolated using sampling points on the gray axis only.

2. The SLI step is also not necessarily compatible with the interpolation used on sandwiching planes. For instance, if tetrahedral interpolation is used on each sandwiching plane, then SLI produces a "hybrid" that is "bilinear", linear on each sandwiching plane, and linear in the transverse direction between them. True tetrahedral interpolation in the full dimension would be linear in each subdividing tetrahedron.

3. SLI handles the basic geometrical configuration with 2 sandwiching linear hyperplanes where the hyperplanes are provided by n−1 coordinates and the transverse direction to the hyperplanes provided by the remaining coordinate. There are other more complicated geometrical situations which SLI cannot handle, or can do so only awkwardly. One scenario is the "gap interpolation problem" between incompatible grids in different dimensions. FIG. 2 depicts a simple 2-dimensional situation in a $x_1 x_2$ space where the interior of the space is covered a rectangular grid, and each of the $x_1$ and $x_2$ axis is covered by different 1-D grids, and furthermore these grids are not compatible. To interpolate in the gap space, consider the three input points $P_1$, $P_2$ and $P_3$. While $P_1$ and $P_2$ can probably be handled by SLI as indicated in the figure, there is no natural way to handle $P_3$. One possibility is to try and apply SLI in the $x_1$ direction, interpolating between $A_3$ and $B_3$, where $B_3$ itself needs to be interpolated first. Another possibility is to apply SLI in the other direction, ending in an interpolation between $C_3$ and $D_3$. Worst of all, one may get different results from each approach. Clearly, when the sandwiching geometric objects are more complicated than linear hyperplanes, SLI is not an ideal tool.

Therefore, a need exists for a color conversion system that employs computational efficient interpolation and yet manages geometrically complex LUTs. Various aspects of the present invention meet such a need.

SUMMARY OF THE INVENTION

A "super-grid" approach may be used to ameliorate the adverse affects of scenarios 1 and 2 from above; however, such an approach is best suited when there are rectangular grids in "codimension 1" spaces, which in that application are the CMY spaces. The present invention is related to the super-grid approach, although it does not use super grids. The present inventions handles scenario 3 from above easily. To do so, the present invention involves an interpolating step (herein termed a "barycentric projection") so the present invention can also be "sequentialized" to produce an interpolation scheme which can be called "Sequential Tetrahedral Interpolation" (STI).

In one aspect of the invention, a unit hypercube enclosing the input value is generated based on values from a look up table. A set of boundary conditions are then imposed on the unit hypercube. To perform the actual interpolation, an initial barycentric projection is performed from a selected vertex of the unit hypercube through the input value onto a boundary of the unit hypercube. If the projection satisfies one of the boundary conditions, an interpolated value is calculated using the projection by back substitution. If the initial projection does not satisfy a boundary condition, an intermediate value is generated from the previous projection and successive barycentric projections are performed using respectively different vertices of the unit hypercube through intermediate values onto a boundary of the unit hypercube until a projection satisfies one of the boundary conditions. An interpolated value is then generated by back substitution using the initial and successive projections.

In another aspect of the invention, a method of determining an interpolated value for a color space is provided. The method includes generating a unit hypercube enclosing an input value. A set of boundary conditions is then imposed on the unit hypercube. A series of barycentric projections are performed from respectively different vertices of the unit hypercube through the input value or intermediate values onto a boundary of the unit cube until a projection satisfies one of the boundary conditions. Once a boundary condition has been satisfied, the interpolated value is generated by back substitution using the series of barycentric projections.

In another aspect of the invention, the boundary conditions include a discrete boundary condition. The discrete boundary condition may be associated with a vertex of the unit hypercube.

In another aspect of the invention, the boundary conditions include a continuous boundary condition. The continuous boundary condition is associated with a facet of the hypercube.

In another aspect of the invention, the boundary conditions include a first continuous boundary condition associated with a first facet of the unit hypercube and a second continuous boundary condition associated with a second facet of the unit hypercube and the continuous boundary conditions agree at an intersection of the first facet and the second facet.

In another aspect of the invention a simplex enclosing the input value is determined. In this embodiment of the invention, the simplex is enclosed by the hypercube and a barycentric projection is performed using a vertex of the simplex.

In another aspect of the invention, an intermediate value used in a barycentric projection is determined from a previous barycentric projection.

This brief summary has been provided so that the nature of the invention may be quickly understood. A more complete understanding of the invention may be obtained by reference to the following detailed description in connection with the attached drawings.

DETAILED DESCRIPTION

Figure 1:
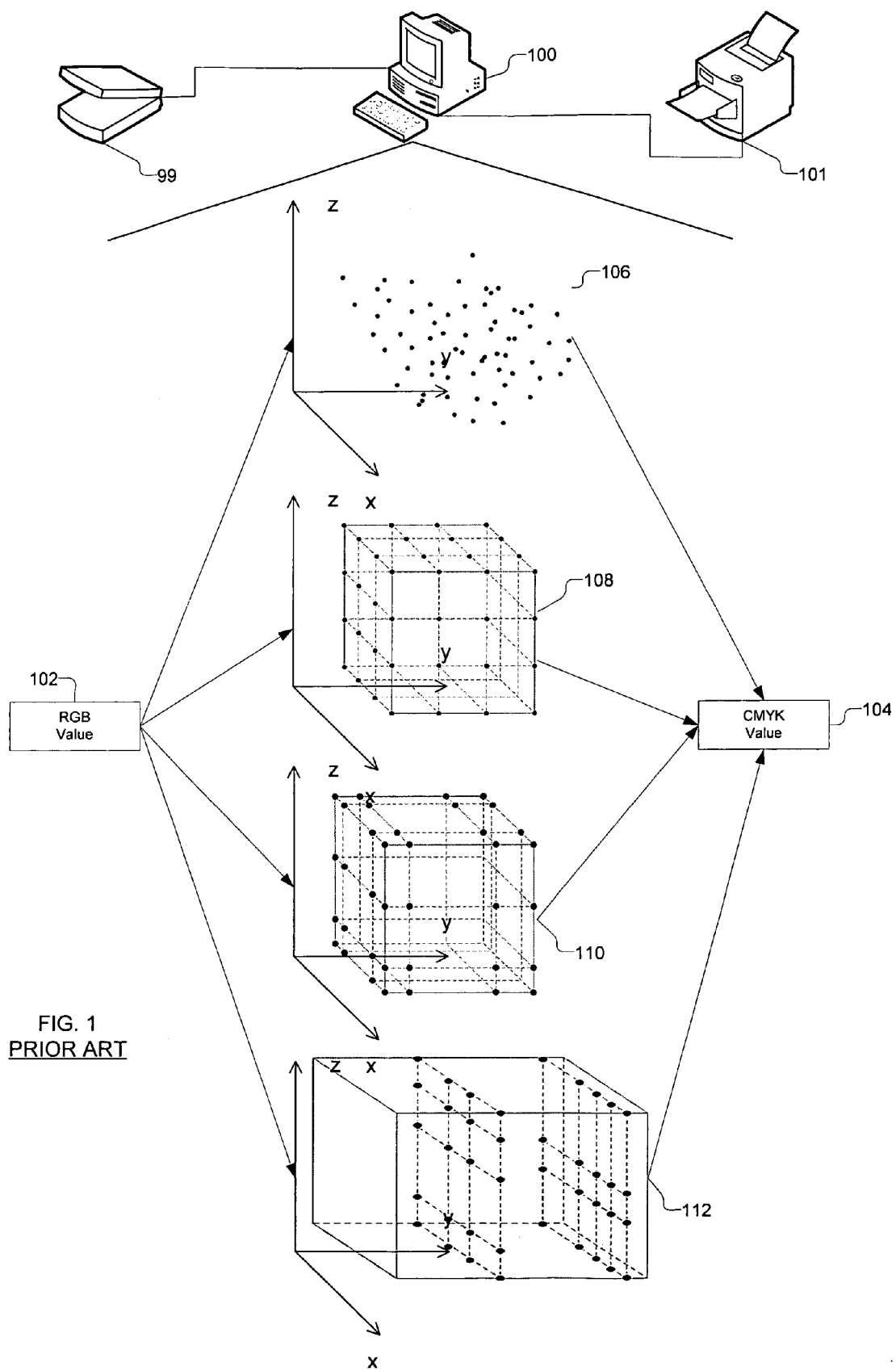
FIG. 1 is a block diagram illustrating use of a LUT by a color device to map from one color space to another.
Figure 2:
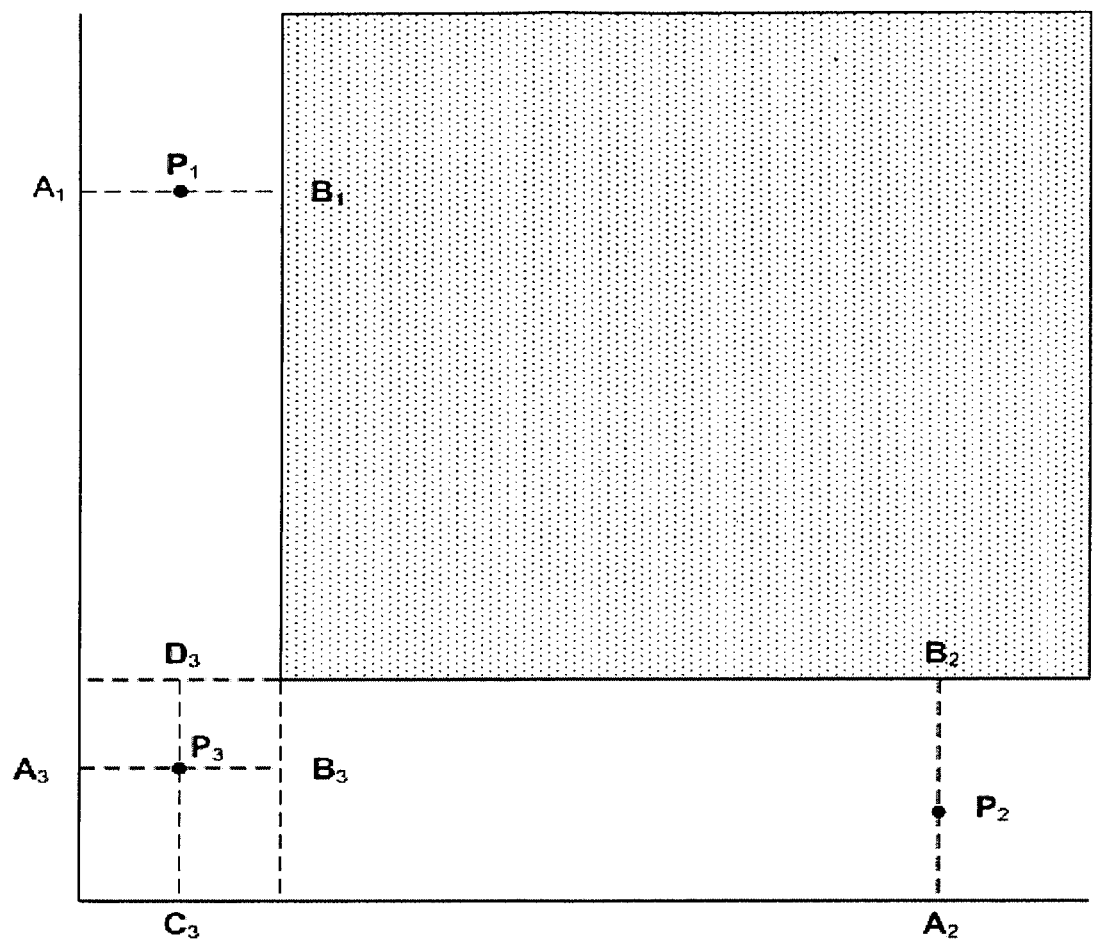
FIG. 2 depicts a simple 2-dimensional situation in a $x_1 x_2$ space where the interior of the space is covered a rectangular grid, and each of the $x_1$ and $x_2$ axis is covered by different 1-D grids, and furthermore these grids are not compatible.

The present invention is directed to a method of interpolation using LUTs in any arbitrary n-dimensional color space. However, throughout the detailed description, examples are given for 2-dimensional and 3-dimensional spaces, it being understood that the interpolation process may be performed in any n-dimensional color space. Therefore, the following terminology is used in order to identify the types of geometric objects representing the manipulations performed during the interpolation process:

A hypercube is a generalization of a measure polytope, such as a 3-cube, to n dimensions. Hypercubes of lower dimension have specific names. For example, a 1-hypercube is a line segment, a 2-hypercube is a square, a 3-hypercube is a cube, and a 4-hypercube is a tesseract.

A simplex is a generalization of a tetrahedral region of space to n dimensions. The simplex is so-named because it represents the simplest possible polytope in any given space. For example, a 2-simplex is an equilateral triangle, a 3-simplex is a tetrahedron, a 4-simplex is a pentatope, etc.

Other generalizations are represented in the following table:

| 2-D | 3-D | 4-D | general |
| --- | --- | --- | --- |
| circle | sphere | glome | hypersphere |
| square | cube | tesseract | hypercube |
| equilateral triangle | tetrahedron | pentatope | simplex |
| polygon | polyhedron | polychoron | polytope |
| line segment | plane | hyperplane | hyperplane |
| square | octahedron | 16-cell cross | polytope |
| polygon edge | face | facet | facet |
| area | volume | content | content |

A basic step in using a rectangular grid as a LUT is interpolation within an enclosing cell. For any input value, the input value's enclosing cell is easily determined. In the case of rectangular grid, the output value at each of the vertices (corner points) of the enclosing cell is specified, and they are also the only boundary conditions (BCs) that an interpolant must satisfy, that is, the interpolant has to pass through all these points. Note that these boundary conditions are on "discrete" points, in this case the $2^n$ corner points of the cell, where n is the dimension of the color space.

Boundary conditions may be formalized as follows. For any subset S of the boundary of the enclosing cell, which will herein be taken as a unit hypercube in n dimensions, a boundary condition on S is a specification of a function BC: $S \rightarrow R^m$, where m is the output dimension. In other words, an interpolant, which may be denoted Interp: $[0,1]^n \rightarrow R^m$, is required to satisfy: Interp(x)=BC(x) for all x in S. In the standard scenario of interpolation on the unit hypercube, S is the set of discrete points that are the $2^n$ vertices of the hypercube.

The following generalization of boundary conditions can solve the issues described above, resulting in a new interpolation algorithm within the unit hypercube. Instead of allowing only discrete boundary points, boundary conditions may be imposed on a whole boundary facet of the hypercube. The precise assumptions are as follows:

(a) The point $v_n=(1,1,\ldots,1)$ is special and only a discrete boundary condition is allowed. In other words, no continuous boundary conditions can be imposed on the n boundary facets $x_i=1$ (i=1, \ldots, n).

(b) For each of the remaining n boundary facets $x_i=0$ (i=1, \ldots, n), boundary condition may be imposed on the whole facet, with the compatibility condition that if two facets intersect, the boundary conditions on the facets should agree on the intersection.

(c) Any vertices not contained in the facets with a boundary condition will have an individual (discrete) boundary condition.

As used herein, a discrete boundary condition is termed "finite data," and a continuous boundary condition is termed "transfinite data." Therefore, the interpolation procedures described here are interpolations on finite and transfinite data.

The following description of tetrahedral, or simplex, interpolation helps to set the notations used for the description of the present invention. It is known that the unit hypercube $[0, 1]^n$ can be subdivided into n! simplexes, parameterized by the set of permutations on n symbols. More specifically, each such simplex is defined by a set of inequalities $x_{\sigma(1)} \geq x_{\sigma(2)} \geq \ldots \geq x_{\sigma(n)}$ where $\sigma: \{1,2,\ldots,n\} \rightarrow \{1,2,\ldots,n\}$ is a permutation of "symbols" 1, 2, \ldots, n, i.e. it is a bijective mapping of the set of n symbols. For example, if n=3 and one uses the shorthand $\sigma=<3, 2, 1>$, meaning $\sigma(1)=3$, $\sigma(2)=2$, $\sigma(3)=1$, then the corresponding simplex is defined by $z \geq y \geq x$, where one uses the common notation x,y,z for $x_1,x_2,x_3$. Also note that these simplexes are not disjoint from each other, but for the purpose of interpolation, points lying on a common facet of 2 distinct simplex will have the same interpolation value regardless of which simplex is used in the interpolation.

Conventionally, in interpolating on finite points, for a given input point $(x_1, \ldots, x_n)$, an interpolation process first determines which simplex the input point lies in, or equivalently the corresponding permutation $\sigma$, by checking the inequalities one simplex by another. Then the simplex interpolant is defined as:

$$Interp(x) = BC(v_0) + \sum_{i=1}^{n} x_i [BC(v_i) - BC(v_{i-1})]$$

where $$v_0 = 0, \quad v_i = \sum_{j=1}^{i} e_{\sigma(j)}$$

for $i=1, \ldots, n$, and $e_1, \ldots, e_n$ are the standard basis vectors. Note that $v_0, v_1, \ldots, v_n$ are the vertices of the simplex, and $1-x_{\sigma(1)}, x_{\sigma(1)}-x_{\sigma(2)}, x_{\sigma(2)}-x_{\sigma(3)}, \ldots, x_{\sigma(n)}$ are the "barycentric coordinates" with respect to the vertices.

However, such a conventional tetrahedral interpolation process cannot handle cases where the boundary conditions are continuous rather than discrete. In contrast, the present invention utilizes a generalization of tetrahedral interpolation capable of handling mixed discrete and continuous boundary conditions. The resultant process, when applied to the case of an interpolation utilizing all discrete boundary conditions, results in a series of barycentric projections and backward substitutions that result in the same answer as that given by the conventional approach.

Figure 3:
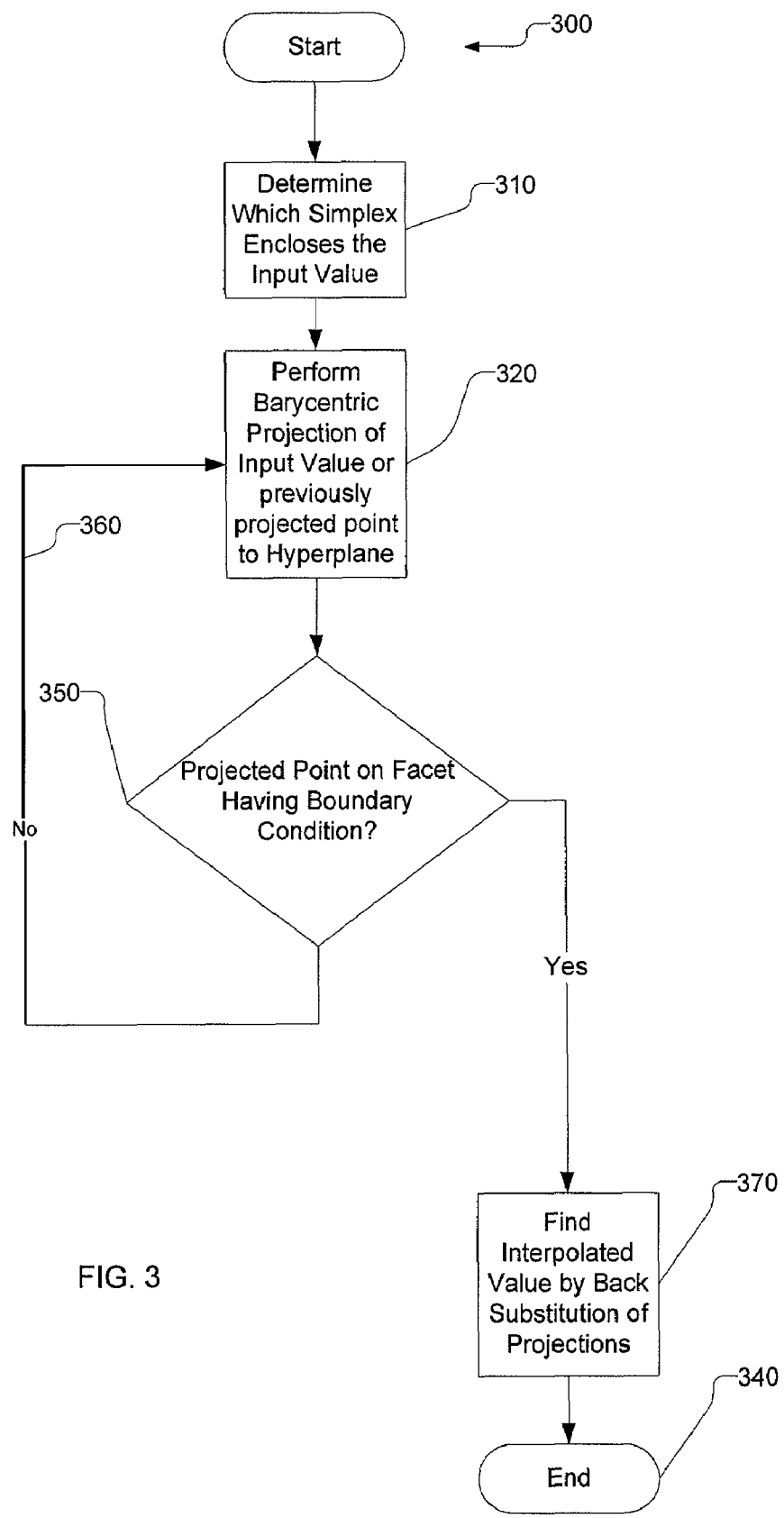
FIG. 3 is a process flow diagram of an interpolation process used by a color device to map input color values in one color space to output color values in another color space in accordance with an exemplary embodiment of the present invention.

FIG. 3 is a process flow diagram of an interpolation process used by a color device to map input color values in one color space to output color values in another color space in accordance with an exemplary embodiment of the present invention. The process 300 uses barycentric projections for a general case of BC's on boundary facets of a unit hypercube. Initially, for a given input value $(x_1, \ldots, x_n)$, the interpolation process first determines (310) which simplex the input value lies in, or equivalently, the corresponding permutation $\sigma$. Then the interpolation process performs a series of barycentric projections as follows.

The first projection $BProj_1(x)$ sends the input value to the plane $X_{\sigma(1)}=0$ (320) unless the input value is already at a vertex, or $x=v_n$, in which case the input value is not changed. The precise definition of the map $BProj_k$ is defined as follows:

$$BProj_k(x) = \begin{cases} p_k + (x - p_k)/(1 - x_{\sigma(k)}) & \text{if } x \neq p_k \\ x & \text{if } x = p_k \end{cases}$$

with $$p_k = v_n - \sum_{i=1}^{k-1} e_{\sigma(n+1-i)}$$

and $k=1, 2, \ldots, n$. In the case $x \neq v_n$, it is clear that $BProj_1(x)$ has the $\sigma(1)$th component annihilated. In other words, the projected point, or intermediate color value, is on one of boundary facets. The interpolation process next determines (350) if the projected point is on a facet on which a BC is defined, in which case the interpolation process can stop making projections. Otherwise, the interpolation process performs (360) another barycentric projection $BProj_2(x')$ where $x'=BProj_1(x)$. If the next projected point is on a vertex or on a facet on which a BC is defined, the interpolation process can stop making projections. Otherwise the interpolation process performs yet another projection. Because every projection annihilates one component, the effective dimension decreases, so that the interpolation process must eventually stop—in the worst case scenario the interpolation process will perform n projections down to dimension 0, i.e. vertices on the hypercube, which by assumption (c) above, will have a BC defined on them.

Assuming that K projections have been performed, with $x^{(k)} = Bproj_k (x^{(k-1)})$, $k=1, \ldots, K$, $x^{(0)} = x$, the input point, and BC is defined at $x^{(k)}$. Then the interpolation process can unwind the projections through back substitution (370) by defining a series of output vectors:

$$y^{(k-1)} = x_{\sigma(k)}^{(k-1)} BC(p_k) + (1 - x_{\sigma(k)}^{(k-1)}) y^{(k)}, k=K, K-1, \ldots, 1.$$

where $y^{(K)} BC(x^{(K)})$, and the process finally obtains the answer, Interp $(x) = y^{(O)}$ (340).

Figure 4:
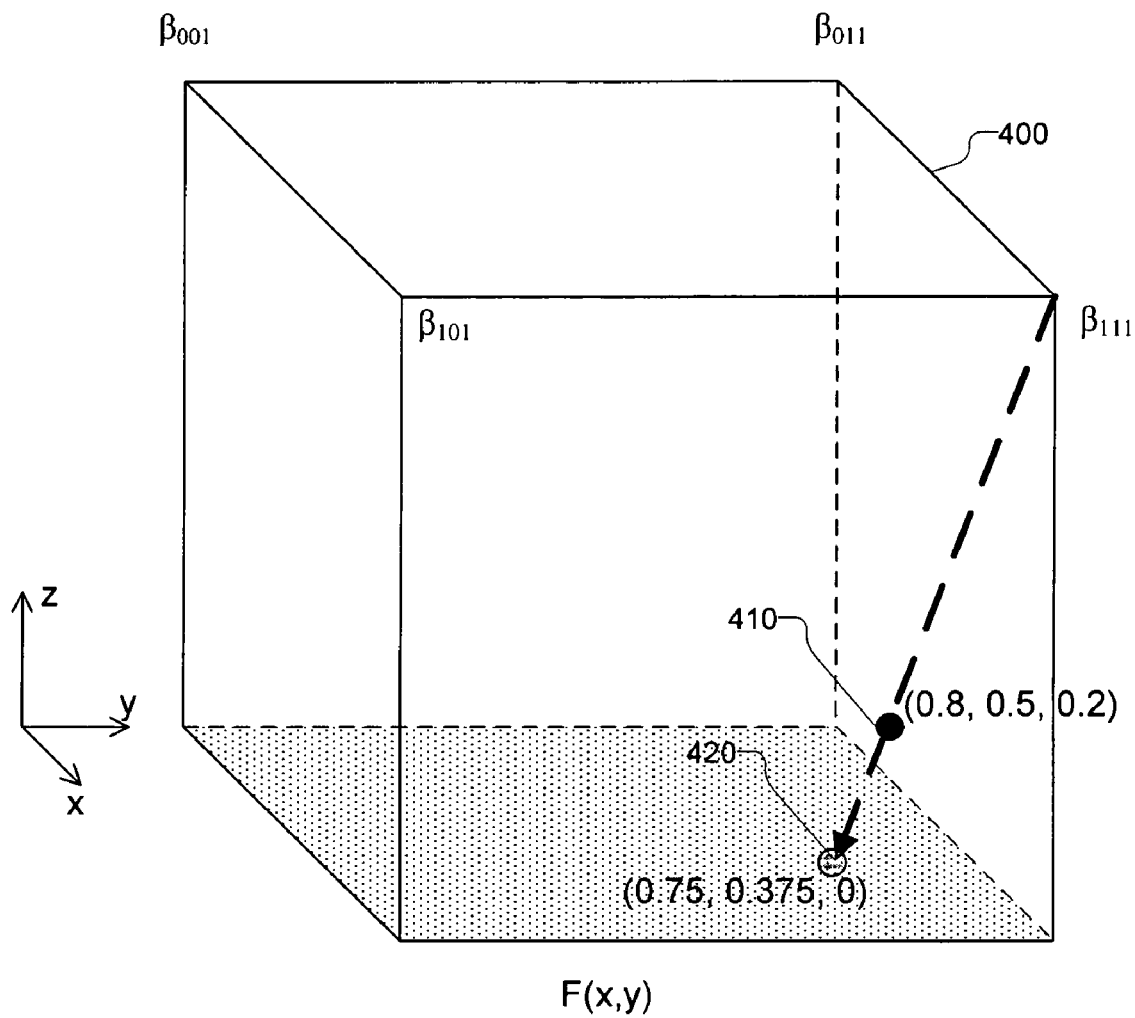
FIG. 4 illustrates an example interpolation in accordance with an exemplary embodiment of the present invention.

FIG. 4 illustrates an example interpolation in accordance with an exemplary embodiment of the present invention. In the example, n=3, m=1, and there are the following BC's on the unit hypercube 400:

(a) 4 discrete BC's on vertices (0, 0, 1): $\beta_{001}$
(0, 1, 1): $\beta_{011}$
(1, 0, 1): $\beta_{101}$
(1, 1, 1): $\beta_{111}$ (b) a continuous BC on the facet $x_3 = 0$: $F(x_1, x_2)$ For the input value x=(0.8, 0.5, 0.2), the enclosing simplex is associated with the permutation<1,2,3>. The $1^{st}$ projection is:

$$p_1 = (1,1,1), x^{(1)} = p_1 + (x - p_1)/(1 - 0.2) = (0.75, 0.375, 0)$$

The first projection is on the facet $x_3 = 0$, so the interpolation process can stop. Backward substitution then gives $y^{(0)} = 0.2\beta_{111} + 0.8F(0.75, 0.375)$ which is the answer.

Figure 5:
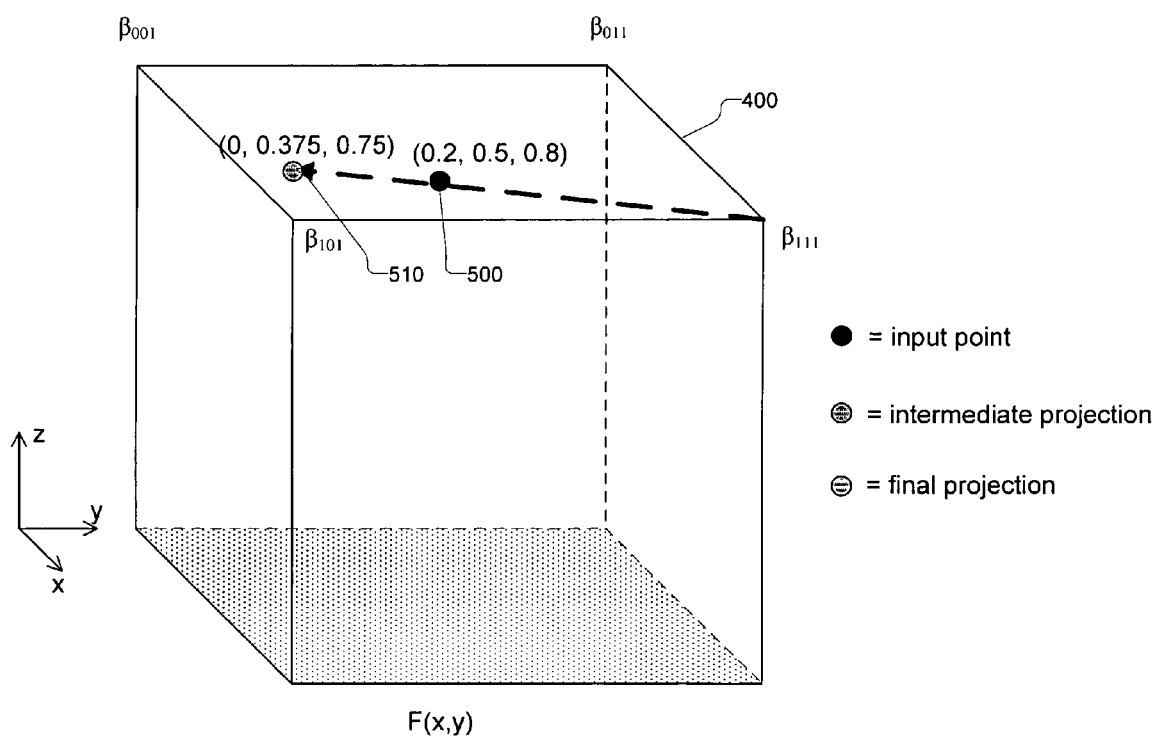
FIG. 5 to FIG. 7 illustrate an example interpolation in accordance with an exemplary embodiment of the present invention.
Figure 6:
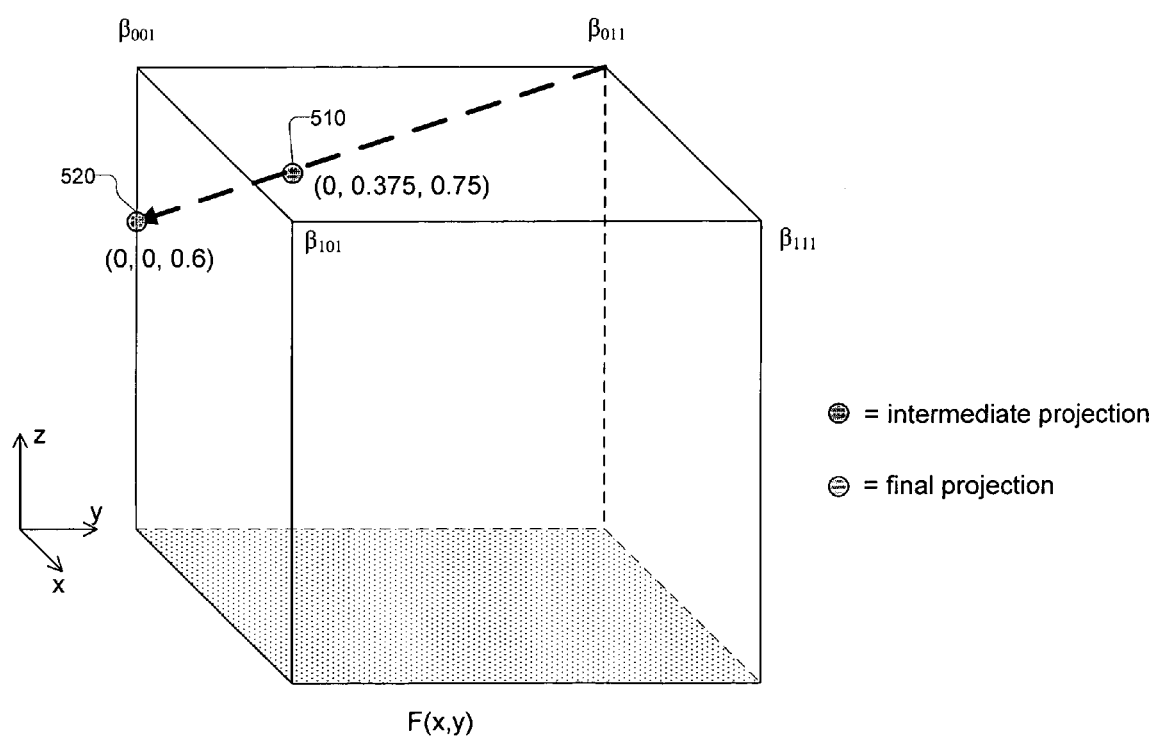
Figure 7:
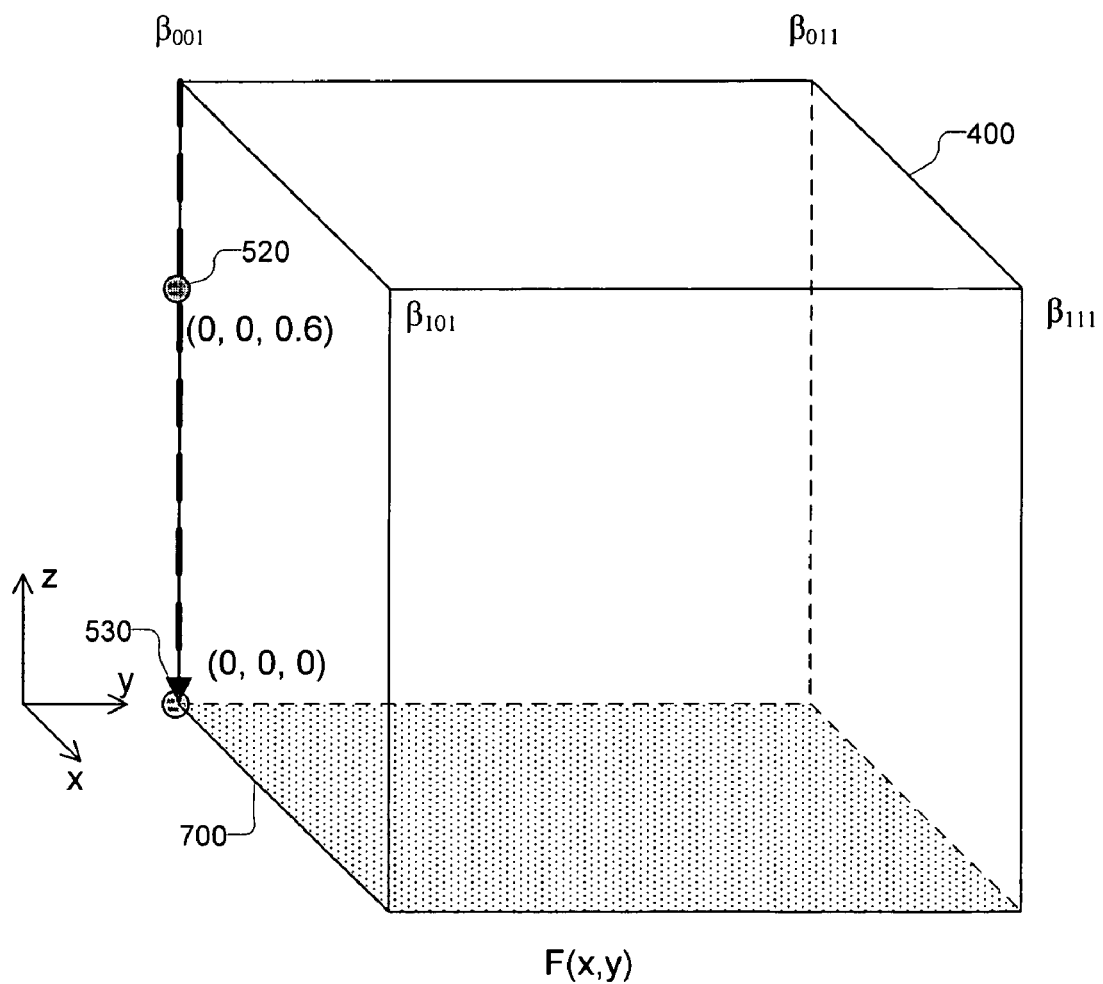

FIG. 5 to FIG. 7 illustrate an example interpolation in accordance with an exemplary embodiment of the present invention. In this example, the hypercube 400 is the same as the previous sample, but the Input point 500 is x=(0.2, 0.5, 0.8) 500. The enclosing simplex associated with the permutation is <3,2,1>.

The $1^{st}$ projection 510 is: $p_1 = (1,1,1)$, $x^{(1)} = p_1 + (x-p_1)/(1-0.2) = (0, 0.375, 0.75)$ The $2^{nd}$ projection 520 is: $p_2 = (0,1,1), x^{(2)} = p_2 + (x^{(1)} - p_2)/(1 - 0.375) = (0, 0, 0.6)$ The $3^{rd}$ projection 530 is: $p_3(0,0,1), x^{(3)} = p^3 + (x^{(2)} - p_3)/(1 - 0.6) = (0,0,0)$ which is on the facet $x_3 = 0$ 700.

Backward substitution then gives:

$$y^{(1)} = 0.375\beta_{011} + 0.625 y^{(2)} = 0.375\beta_{011} + 0.375\beta_{001} + 0.25 F(0,0)$$

which is the final answer. Note that this is identical to tetrahedral interpolation on the 4 points (1,1,1), (0,1,1), (0,0,1) and (0,0,0), confirming that the interpolation process is indeed a generalization of the tetrahedral interpolation process.

Figure 8:
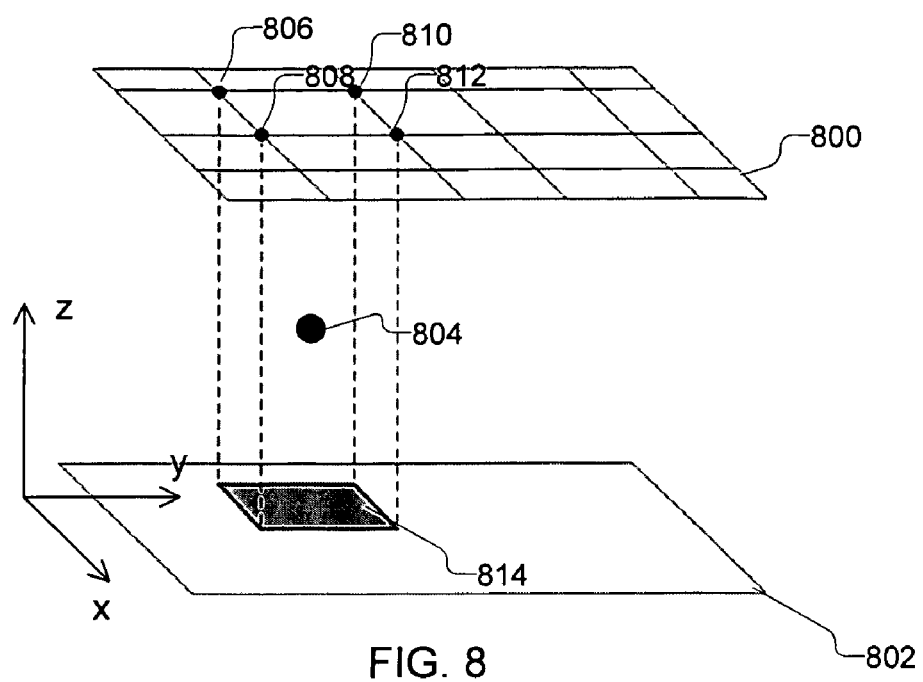
FIG. 8 illustrates an example of how an interpolation process in accordance with an exemplary embodiment of the present invention manages interpolation between two hyperplanes having incompatible grids.

FIG. 8 illustrates an example of how an interpolation process in accordance with an exemplary embodiment of the present invention manages interpolation between two hyperplanes, 800 and 802, having incompatible grids. In the example a cell enclosing a given point 804 is shown in the figure. The "top" vertices of the cell, 806, 808, 810 and 812, come directly from the grid in the top plane. The vertices in the "bottom" facet 814 are not compatible with the grid in the bottom plane, so the interpolation process just treats the whole facet as having a BC with values obtained by interpolation on the grid in the bottom plane. It is then clear that this setup satisfies assumptions (a), (b) and (c) from above, and the interpolation process can be successfully performed.

It is also clear that the interpolation process has reduced the dimension of the interpolation problem by 1 because the result is a linear combination of values at the vertices in the upper grid, and an interpolated value in the lower plane, which has dimension one less. If a similar sandwiching plane configuration exists inside the lower plane, the interpolation process can in turn apply the procedure in the lower plane, further reducing the dimension by one. This procedure can continue until the interpolation process reaches dimension 0. This cascade of projections and interpolations can be called "Sequential Tetrahedral Interpolation."

Figure 9:
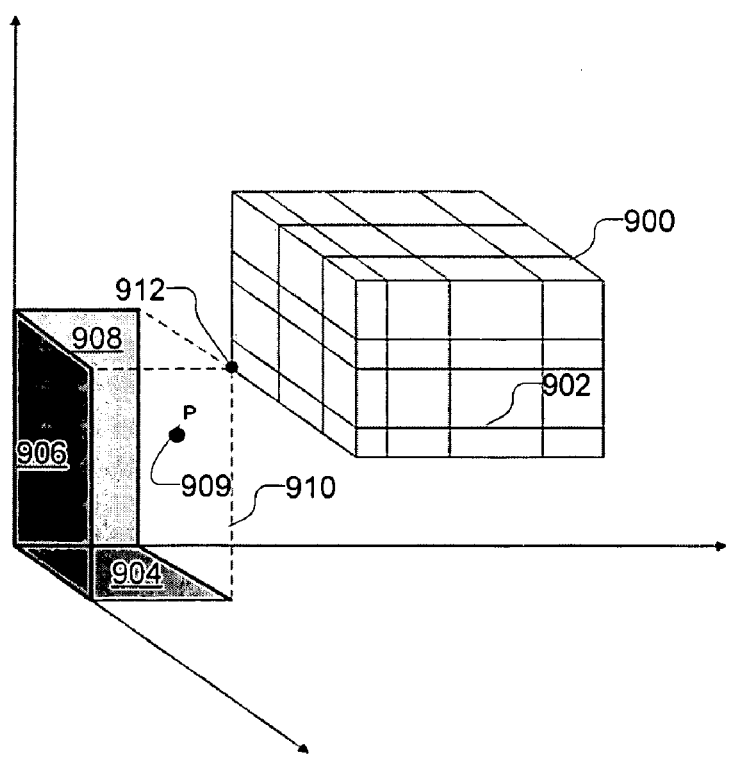
FIG. 9 is an illustration of an interpolation process for an input value that falls in a "gap" in accordance with an exemplary embodiment of the present invention.

FIG. 9 is an illustration of an interpolation process for an input value that falls in a "gap" in accordance with an exemplary embodiment of the present invention. In this example, a grid is imposed on a hypercube 900 sitting strictly inside the positive quadrant. The hypercube itself has a grid 902 on it, and each coordinate hyperplane, 904, 906 and 908, may have grids that are not necessarily compatible with the grid on the hypercube or with each other. The "gap" between the hypercube and the coordinate planes has a cross-section that is "L-shaped" and is not amenable to standard techniques such as SLI. However, with the interpolation process described herein, cells enclosing an input value 909 are introduced that easily cover this gap, such as cell 910. The grids on the coordinate planes support interpolation that provides the necessary BC's for all the lower bottom facets of the cell, while the BC at the one remaining vertex 912 is provided by the lower corner of the hypercube.

In actual application, the "unit hypercube" that is the basic setting of the interpolation process described herein is extracted from larger lattices, and the values at the vertices may require expensive calculation. On the other hand, it is also clear that tetrahedral interpolation requires only the values at the vertices of the simplex, which is a subset of all the vertices of the unit hypercube. It is therefore more efficient, even imperative in some situations, to implement what can be called "deferred evaluation". In detail, in a software implementation of the interpolation process, it is typical to have a subroutine that takes the unit hypercube and values at its vertices as input. By deferred evaluation, one can instead of passing the values at the vertices, simply pass the necessary information to evaluate the values of the vertices, without actually carrying out the evaluation. Inside the subroutine, actual evaluation of these values will be carried out only for those vertices that belong to the enclosing simplex, after the enclosing simplex is determined.

Figure 10:
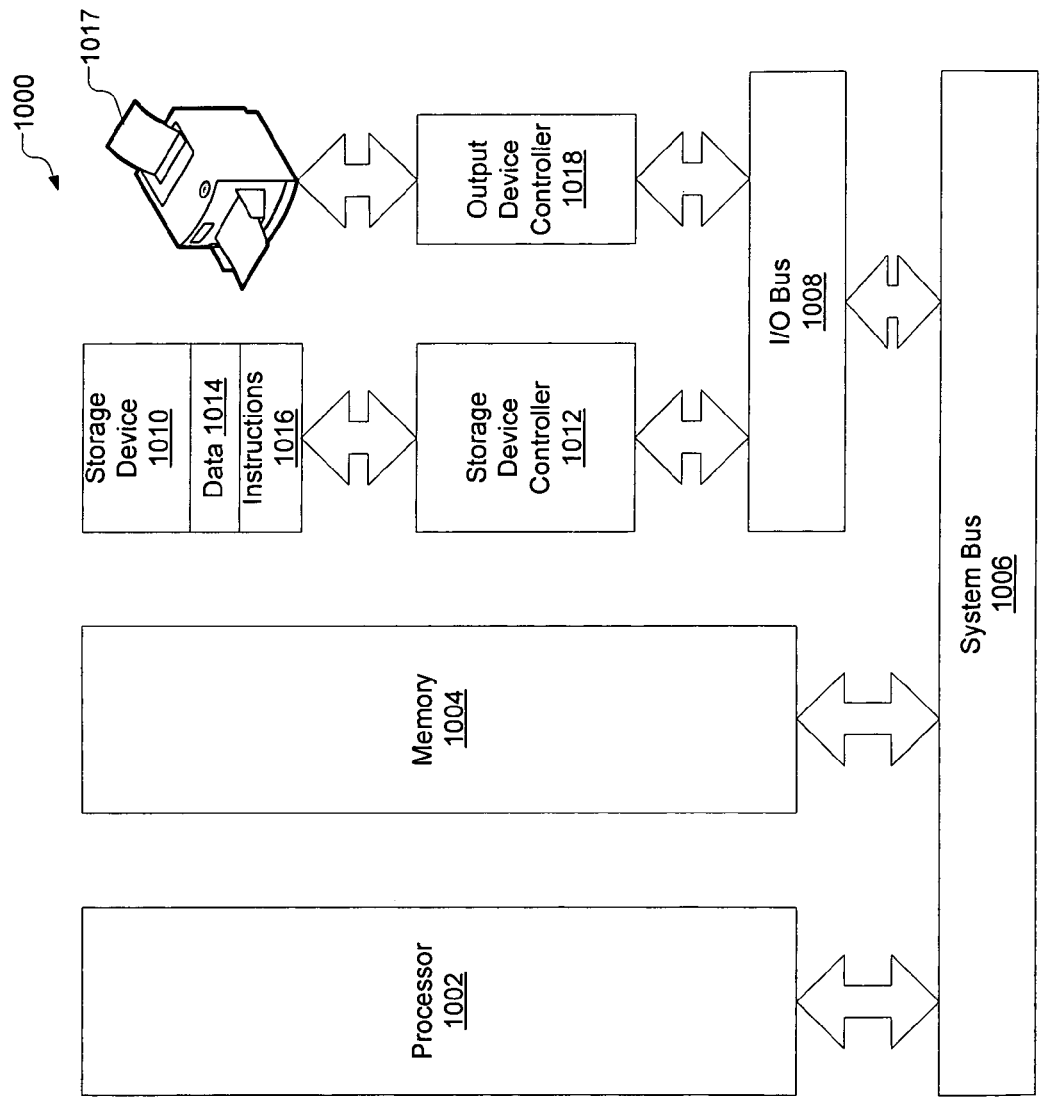
FIG. 10 is a block diagram of a data processing system, such as a color device, that may be used to host an interpolation process as described above in accordance with an exemplary embodiment of the present invention.

FIG. 10 is a block diagram of a data processing system, such as a color device, that may be used to host an interpolation process as described above in accordance with an exemplary embodiment of the present invention. The data processing system 1000 includes a processor 1002 coupled to a memory 1004 via system bus 1006. The processor is also coupled to external Input/Output (I/O) devices via the system bus and an I/O bus 1008. A storage device 1010 having computer system readable media is coupled to the processor via a storage device controller 1012 and the I/O bus and the system bus. The storage device is used by the processor to store and read data 1014 and program instructions 1016 used to implement the interpolation process described above. The processor may be further coupled to an output device, such as a color output device 1017, via an output device controller 1018 coupled to the I/O bus.

In operation, the processor loads the program instructions from the storage device into the memory. The processor executes the loaded program instructions to receive an input color value in a first color space. The processor then executes the program instructions to generate an output color value in a second color space as described above.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A method of determining an interpolated value for a color space, comprising:
    generating a unit hypercube enclosing an input value;
    imposing a set of boundary conditions on the unit hypercube;
    performing barycentric projections from respectively different vertices of the unit hypercube through the input value or intermediate value onto a boundary of the unit hypercube until a projection satisfies one of the boundary conditions; and
    determining the interpolated value by back substitution using the barycentric projections.

2. The method of claim 1, wherein the boundary conditions include a discrete boundary condition.

3. The method of claim 2, wherein the discrete boundary condition is associated with a vertex of the unit hypercube.

4. The method of claim 1, wherein the boundary conditions include a continuous boundary condition.

5. The method of claim 4, wherein the continuous boundary condition is associated with a facet of the hypercube.

6. The method of claim 1, wherein:
    the boundary conditions include a first continuous boundary condition associated with a first facet of the unit hypercube and a second continuous boundary condition associated with a second facet of the unit hypercube; and
    the continuous boundary conditions agree at an intersection of the first facet and the second facet.

7. The method of claim 1, further comprising determining a simplex enclosing the input value, wherein:
    the simplex is enclosed by the hypercube; and
    a barycentric projection is performed using a vertex of the simplex.

8. The method of claim 1, wherein when performing a barycentric projection from respectively different vertices of the unit hypercube through the intermediate value onto a boundary of the unit hypercube, the intermediate value is determined from a previous barycentric projection.

9. A computer-readable medium which stores computer-executable instructions, said computer-executable instructions for determining an interpolated value for a color space, the computer-executable instructions causing a computer to perform a method according to any of claims 1 to 8.

10. An apparatus for determining an interpolated value for a color space, the apparatus comprising:
    a program memory for storing instructions executable to perform a method according to any of claims 1 to 8; and
    a processor coupled to the program memory for executing the instructions stored in said program memory.

* * * * *